June 14, 1960  H. R. HITCH ET AL  2,940,665
GEOGRAPHIC REFERENCE CONVERTER
Filed Dec. 4, 1953  5 Sheets-Sheet 1

INVENTORS.
HAROLD R. HITCH
ROBERT W. RAMSEY
BY THOMAS W. RICHARDS

ATTORNEYS

June 14, 1960  H. R. HITCH ET AL  2,940,665
GEOGRAPHIC REFERENCE CONVERTER
Filed Dec. 4, 1953  5 Sheets-Sheet 2

INVENTORS.
HAROLD R. HITCH
ROBERT W. RAMSEY
BY THOMAS W. RICHARDS

ATTORNEYS

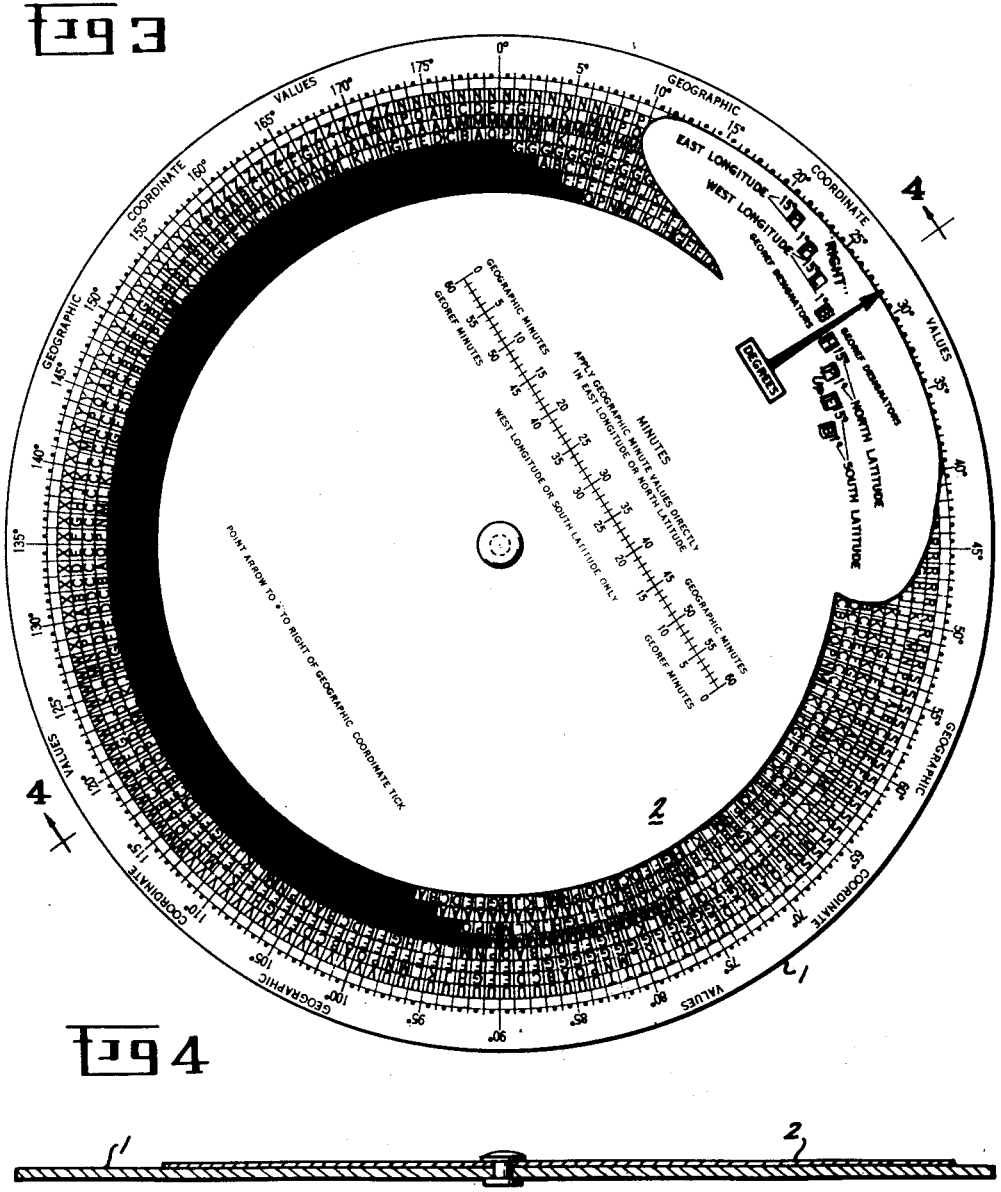

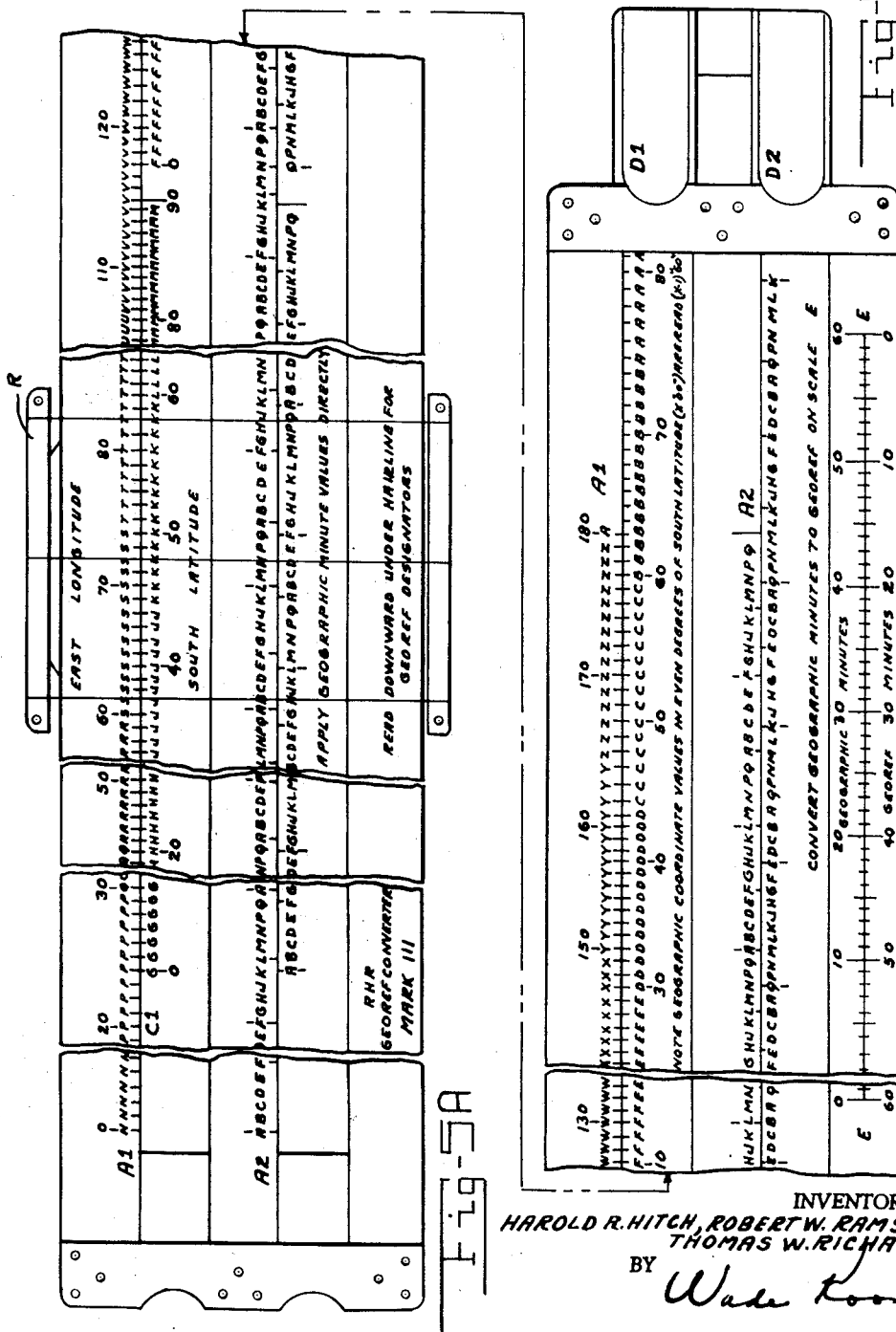

INVENTORS
HAROLD R. HITCH, ROBERT W. RAMSEY
THOMAS W. RICHARDS
BY
ATTORNEY

United States Patent Office 2,940,665
Patented June 14, 1960

2,940,665
GEOGRAPHIC REFERENCE CONVERTER

Harold R. Hitch, 2817 39th St. NW., Washington 7, D.C.; Robert W. Ramsey, 9403 49th Ave., College Park, Md.; and Thomas W. Richards, 46F Crescent Road, Greenbelt, Md.

Filed Dec. 4, 1953, Ser. No. 396,356

3 Claims. (Cl. 235—70)

(Granted under Title 35, U.S. Code (1952), sec. 266)

The invention described herein may be manufactured and used by or for the Government for governmental purposes without payment to us of any royalty thereon.

This invention relates to a geographic reference converter whereby geographic coordinates may be directly converted to geographic reference codal designations, which may be abbreviated as Georef designators, and vice versa with a simple operation.

To provide a proper understanding of the invention, the Georef system, as it is called, is a highly simplified method of designating geographic locations, expressing latitude and longitude in a form suitable for rapid plotting. The system obviates the difficulties and confusions arising both from conventional latitude and longitude references and from the great complexity of rectangular grids in use over large areas by ground forces. The system may be applied to any graduated map or chart regardless of the type of projection and is based on a graticule of meridians of longitude and parallels of latitude of which the prime meridian is that of Greenwich with the point of origin at the South Pole on the 180th meridian. By the Georef system the surface of the earth is divided into quadrangles, the sides of which are specific arc lengths of longitude and latitude, each quadrangle being identified by a simple systematic lettered code giving positive identification with no risk of ambiguity. There are twenty four longitudinal zones each 15 degrees in width, that is one hour in time each, extending eastwards from the 180th meridan. These zones are lettered A to Z inclusive, omitting I and O. There are 12 bands of latitude,, each of 15° depth extending northwards from the South Pole to the North Pole, the bands being lettered from A to M inclusive, omitting I, northwards from the South Pole. Accordingly, this code divides the earth's surface into 288 15° quadrangles, each of which is identified by two letters, the first letter being that of a longitudinal zone, and the second that of a latitude band. For example, Seoul, Korea is in the 15° quadrangle W J. Each 15° quadrangle is further subdivided into fifteen one degree zones of longitude eastwards from the western meridian of the quadrangle, the degrees being designated by letters A to Q inclusive, omitting I and O. Each 15° quadrangle is also subdivided into 15 one degree bands of latitude northward from the southern parallel of the quadrangle and these units are similarly lettered A to Q, omitting I and O. Accordingly, one degree quadrangle anywhere on the earth's surface can be identified by four letters, the first two being the reference to the specific 15° quadrangle, the third identifying the one degree longitude zone therein and the fourth letter identifying the one degree latitude band. Seoul is in the one degree quadrangle W J G H.

Each one degree quadrangle is further divided into 60 numbered minutes of longitude eastwards from the western meridian of the one degree quadrangle and 60 numbered minutes of latitude measured northwards from the southern parallel of the one degree quadrangle. The direction of numbering is consistent regardless of location of the one degree quadrangle. Accordingly, a unique reference defining any position on the earth's surface with an accuracy within a minute of latitude and longitude can now be given by four letters and four numerals, the first two numerals being the number of minutes of longitude by which the point lies eastwards of the western meridian of the one degree quadrangle, and the last two numerals are the number of minutes of latitude by which the point lies northward of the southern parallel of the quadrangle. Thus, Seoul becomes W J G H 5832. For greater accuracy the minute quadrangle may each be subdivided into tenths of a minute quadrangles in a similar manner and six numerals used to identify the longitude and latitude of a point to an accuracy of one tenth of a minute which is approximately 608 feet. This subdivision may progress to obtain the accuracy desired.

Prior to the subject invention the conversion of geographic coordinates to the geographic reference system was and has been a cumbersome, tedious and time consuming operation.

The invention creates slide rule type converters or translators whereby direct and immediate conversion of geographic coordinates to the Georef system may be accomplished or vice versa. This permits any map or chart carrying only the standard geographic coordinates grid to be used in plotting positions referenced by Georef designators and further eliminates any map or chart where only straight conversion is the problem. The conversion process by the invention also would eliminate the need for tedious resection of referenced points on a chart overprinted with both grids as well as the errors to which such system is subject.

An object of the invention is to provide a new and novel slide rule type of converter to provide immediate accurate conversion of geographic coordinates to the geographic reference system and vice versa.

A further object of the invention is to provide a new and novel converter unit of a circular slide rule type whereby geographic coordinates may be directly converted to Georef designators and vice versa.

Other objects and advantages of this invention will be readily apparent to those versed in the art from the following description taken in conjunction with the accompanying drawings wherein:

Fig. 3 is a view similar to Fig. 2 identifying a particular latitude on the converter;

Fig. 4 shows a cross-sectional view of the structure of Fig. 3;

Figures 5A and 5B show a composite front view of a modification of the novel converter of Fig. 2;

Figure 1:
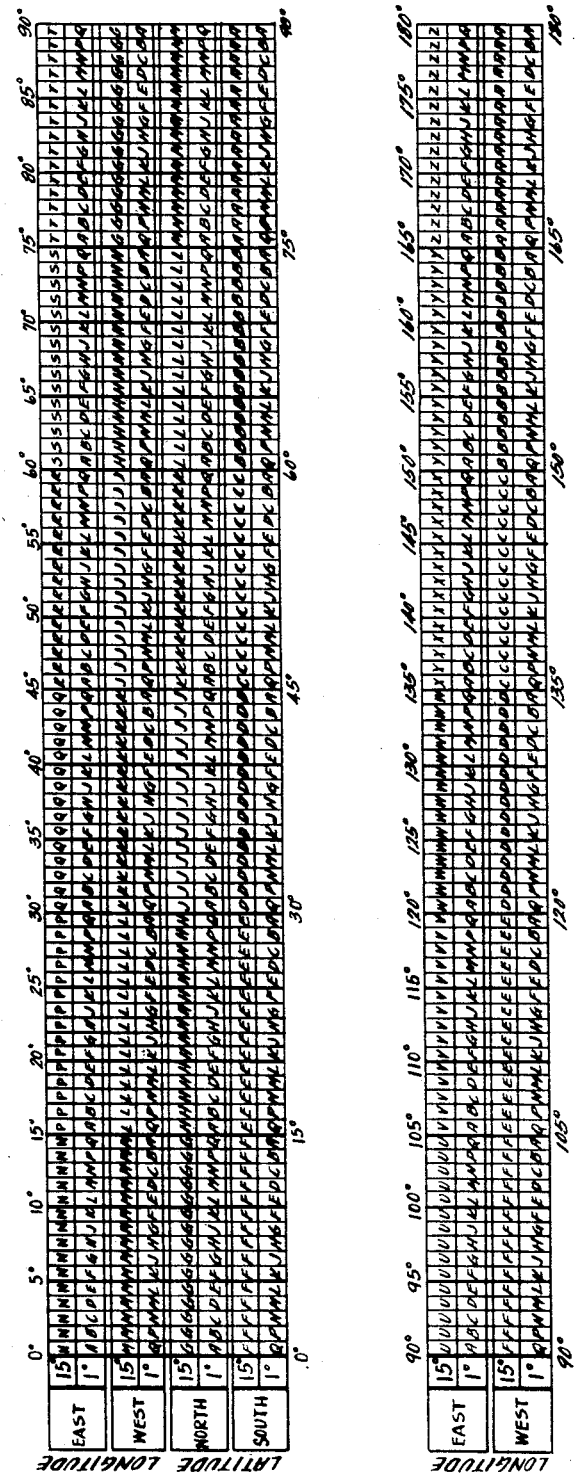
Fig. 1 shows in linear fashion the graphic relation of the Georef designators and geographic coordinates.

As can be seen in Fig. 1 of the drawings, particular letters relate in the fashion indicated to particular quadrangles on the earth's surface by the Georef system, and these letters are related to specific geographic coordinates.

Figure 2:
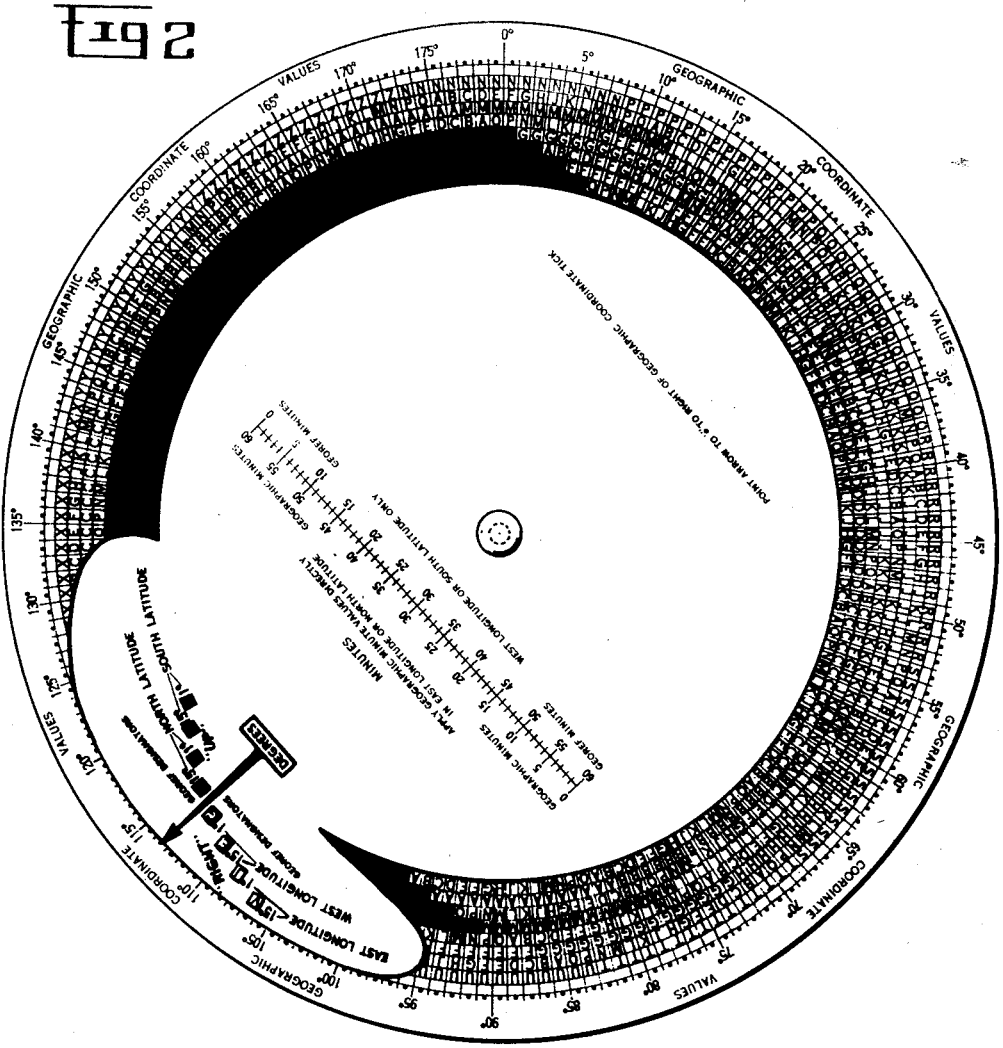
Fig. 2 shows the novel converter of the invention presented in a circular slide rule identifying a particular longitude.

Fig. 2 presents on a base 1 a circular presentation of the appropriate Georef letters or designators as shown in Fig. 1 related to a circular presentation of the 180° which represents the range of geographic coordinates. As only 90° of latitude need be considered the nonessential 90° portion of the inner or latitude circles are eliminated.

For a detailed description of the converter of Fig. 2, the base 2 comprises ten concentric circles equally spaced with radial lines dividing the respective circles into a representation of degree intervals. Geographic coordinates from zero through 179° are calibrated about the periphery of the largest circle, the degrees being identified by the radial lines. The inner nine circles give eight circular bands each equally subdivided by the radial lines within which subdivisions are located the appropriate letters corresponding to the Georef designators indicated in linear fashion in Fig. 1. Proceeding inwardly the eight circular bands give successively the single letter designators for each of the following quadrangles:

15° east longitude
1° east longitude
15° west longitude
1° west longitude
15° north latitude
1° north latitude
15° south latitude
1° south latitude Superimposed on the base member 1 is a circular disk member 2 having a radial pointer thereon and eight offset apertures of a size and stepped arrangement as shown in Fig. 2 so as to expose only one designator in each band when centered on the base member for proper reading. On the base member on the outer circle midway between each pair of degree markers is a dot or tick. In use of the converter to obtain a proper reading the pointer on the disk member must always point to a tick on the base member or one half graduation beyond the given geographic coordinate tick in the outer circle in a clockwise direction. When the pointer on the disk is set on a midway tick, each of the eight apertures will expose and will be directly centered about a single letter designator. Thus when the pointer is set at the tick following 0° on the geographic coordinate circle from left to right in stepped relation the apertures expose the first N in the east longitude 15° aperture, A in the east longitude 1° aperture, the first M in the west longitude 15° aperture, Q in the 1° west longitude aperture, the first G in the north latitude 15° aperture, A in the 1° north latitude aperture, the first F in the south latitude 15° aperture, and Q in the 1° south latitude aperture. The geographic designators are so arranged in their respective bands that a 0° designation of the geographic coordinates will expose the appropriate 0° Georef designators in the apertures on the disk member. Accordingly, when a specific longitude or latitude on the geographic coordinate scale is indicated by the pointer the proper Georef designators may be read off the appropriate apertures in the disk member. In clockwise order the apertures expose, east longitude 15°, then 1° quadrangle designator, the west longitude 15°, then 1° designator, and to the right of the pointer the north latitude 15° and 1° designators successively, and the south latitude 15° and 1° designators.

For example to convert the given geographic coordinates 28°53′ N–113°36′ W the converter which is the subject of this invention is used as follows:

The longitude setting is translated first, so that the pointer arrow on the disk member is set on the tick to the right of 113° on the geographic coordinate circle as shown in Fig. 2. Then looking at the apertures in the disk member, labelled west longitude, the letters in the 15° and 1° apertures respectively are the Georef designators E, G which identify the specific longitude. Then the pointer is set on the tick to the right of 28° and the north latitude apertures expose the letters H, P to identify the Georef designators for the specific latitude. By combining the 15° designators and the 1° designators, thus E H G P there is identified a specific 15° quadrangle on the earth's surface and a specific 1° quadrangle within the 15° quadrangle, which corresponds to 28° N–113° W. Then in number of minutes W longitude are converted since the readings in the Georef system are from west to east giving 24 whereas the latitude north minutes are applied directly since the readings in the Georef system are from south to north. Thus the Georef translation of 28°53′ N–113°36′ W is E H G P 2453. As can be seen there has been accomplished a quick accurate translation to the Georef system. By a simple reverse operation of setting E G to be exposed in the longitude apertures on the disk member, and then H P in the latitude apertures and applying the appropriate direct or reverse reading of the minute designators depending on direction, the appropriate geographic coordinate translation is readily available. It is noted that conversion of the minute reading is necessary only where the directions are south or west since the Georef system, regardless of location reads from south to north parallel and from west to east meridian.

Because the order of progression for west longitude and south latitude geographic coordinate designators is directly opposite to their Georef equivalents, interconversion requires the introduction of positive and negative increments. For example 15°00′00″ south latitude becomes 14°59′59″9999+ south when converted to Georef designators. Conversely when converting the Georef designators to geographic coordinates the increment loss must be added. Since the scoring of such minute subdivisions is not practical it is ignored in all cases except where the referenced point falls on an even degree of west longitude or south latitude, that is X°00′ which must be considered as (X−1)°60′ and the converter is set at (X−1)° and the conversion of 60′ gives 00. This must be provided for since a change of Georef alphabetic designators is involved. Similarly in converting from Georef designators to geographic coordinates one degree must be added to those west longitude or south latitude values which include 00′ Georef minutes. For example: J F H M 0000 is, the Georef designator for 53°00′ W–04°00′ S. J H gives 52 W and F M gives 03° S. But since the minutes are 0000 one degree or 60′ is added to each in the conversion of the W and S designators giving 53°00′ W–04°00′ S.

According it can be seen how simple and accurate the novel invention is to accomplish the desired result. A direct interconversion of geographic coordinates and Georef designators is made possible by a slide rule technique of presenting the problem on the scales and an answer or translation is presented immediately.

A modification of the invention is presented in Figs. 5A, 5B and 6A, 6B of the drawings. In this modification of the invention is utilized a straight sliding dual scale so calibrated, arranged and joined that single settings of a hairline indicator and adjustable scales permit the direct reading of Georef designators in proper sequence.

As can be seen in Figs. 5A, 5B and 6A, 6B, A, C and D scales are used in conversion of point positions in the eastern hemisphere, and the B, C and D scales on the reverse side are utilized in the conversion of western hemisphere coordinates. The scales may be superimposed and calibrated on any standard straight slide rule scale. On the A and B scales are respectively calibrated from 0° to 180° geographic coordinates with the corresponding alphabetic designators of the 15° quadrangles of the Georef system scaled to identify the corresponding geographic coordinate. The A scale identifies the east longitude while the B scale defines the west longitude. The A and B scales as can be seen from the drawings are on the major or base portion of the rule. It is noted the $A_1$ and $B_1$ scales identify the 15° quadrangles and the $A_2$ and $B_2$ scales identify the 1° quadrangles with a calibration of the appropriate Georef designators to the 180° geographic coordinate calibration. The central insert sliding portion of the rule has on either side the C and D scales which are calibrated respectively to identify 90° of north and south latitude with a scaling of appropriate Georef designators, both for the appropriate 15° quadrangle identification and 1° quadrangle identification. The calibration and scaling is based on the relationship of the geographic coordinates and Georef designators as shown in Fig. 1 of the drawings.

The rider R on the rule is used to solve the translation and inter-conversion problems.

To convert geographic coordinates to Georef equivalents on this second form of the invention:

(1) Adjust rider so hairline centrally thereof coincides with the numerical longitude value in degrees that is on scale A-1 or B-1 depending on whether east or west.

(2) Adjust sliding scale bars so the numerical latitude value on either C-1 or D-1 depending on whether north or south is brought into coincidence with the hairline.

(3) Read downwards the Georef designators indicated by the hairline which appear in proper sequence. North and east minute values as in the first modification are directly applied and south and west values are converted in a manner similar to the first modification before adding to the alphabetical designators.

*Example:* Given 52°48' W-3°-25' S.

Figure 6A:
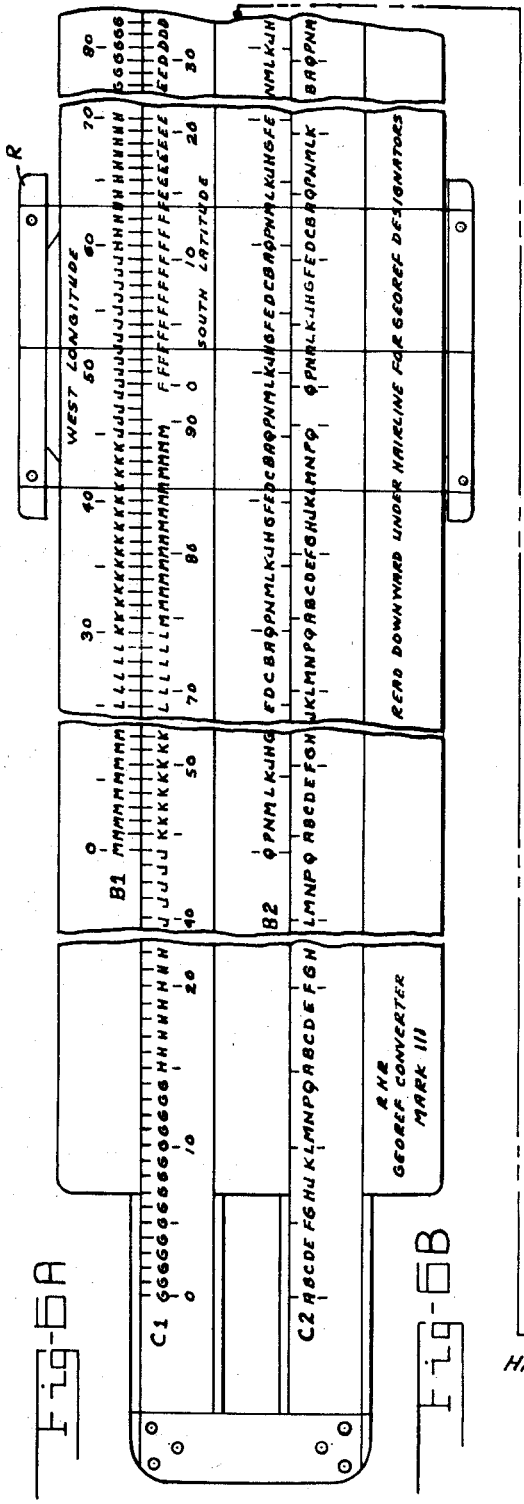
Figures 6A and 6B show a composite rear view of the modification shown in Figs. 5A and 5B.
Figure 6B:
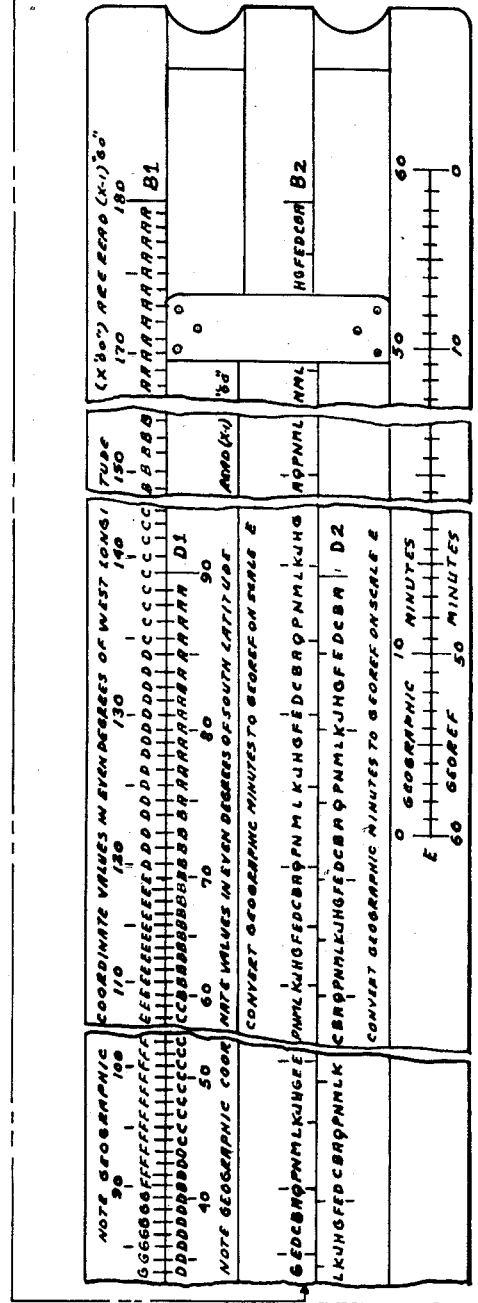

(1) Set hairline at 52° on B-1, see Fig. 6A.

(2) Adjust sliding scale until 3° on D-1 is centered under the hairline.

(3) Read downward under the hairline on scales B-1, D-1, B-2, D-2, and obtain the proper Georef designators J F H M.

(4) Since the readings are west and south, convert the minutes giving J F H M 1235.

It is noted that each form of the invention has a conversion scale printed thereon for readings of west longitude or south latitude.

To reconvert Georef designators to geographic coordinates:

(1) Set the first and third letters J H by centering the rider hairline thereon.

(2) Adjust the sliding scale portion to center F M under the hairline.

(3) Read the numerical values of longitude and latitude directly aligned under the hairline.

(4) To get minutes of longitude and latitude, convert the Georef numerals since the readings are indicated as south and west.

As can be readily seen the invention supplies, in either form an economical, accurate, rapid means for interconversion of geographic coordinates and Georef designators. Such a device fills a great need in the art and is the first of its nature to accomplish the desired result.

Both modifications eliminate the necessity for reference maps in straight conversion problems, and permit precision interconversion at all times removing conversion difficulties.

The forms of the invention described herein are but examples and other similar modifications will be readily apparent to those versed in the art and are within the scope of the invention. The 15° zones of longitude or latitude may each be referred to as major zones and the 1° subdivisions of the major zones may be referred to as minor zones. Further, the codal symbols for each major zone may be termed major zone symbols and the codal symbols for each minor zone may be referred to as minor zone symbols. Thus, the conventional geographic coordinate parameters of longitude and latitude are codally represented in the Georef code by major and minor codal zone symbols. For each geographic location conventionally denoted by coordinate longitude and latitude parameters, the corresponding codal designator or code word will include in series, from left to right or in word order, a major longitude zone symbol, a major latitude zone symbol, a minor longitude zone symbol, and a minor latitude zone symbol.

What is claimed is:

1. An interpreting device for inter-conversion of conventional geographic longitude and latitude indicia and their corresponding code words, each including in word order a major longitude zone codal representation, a major latitude zone codal representation, a minor longitude zone codal representation, and a minor latitude zone codal representation; said interpreting device comprising a first unit provided with three relatively fixed parallel scale elements, one of which bears conventional longitude indicia and the other two of which are spaced apart in a direction transverse to their length and respectively bear the corresponding major and minor longitude zone codal representations, a second similar unit provided with three relatively fixed parallel scale elements also parallel to the scale elements on the first unit, one of the scale elements on the second unit bearing conventional latitude indicia and the other two scale elements on the second unit being spaced apart in a direction transverse to their length and respectively bearing the corresponding major and minor latitude zone codal representations, the scale elements of the first and second units being staggered relatively in said transverse direction with the major latitude zone scale element extending along the space between the major and minor longitude scale elements and the minor longitude scale element extending along the space between the major and minor latitude scale elements, and a common indexing member for all the scale elements, and means for mounting said first and second units and said indexing member in association with one another for relative movement in a direction parallel to the scale lengths to register the index member with any desired conventional longitude and latitude indicia and thereby concurrently to register with the index member the corresponding major longitude zone codal representation, the major latitude zone codal representation, the minor longitude zone codal representation, and the minor latitude zone codal representation in code word order.

2. An interpreting device for translating conventional geographic coordinate parameters into corresponding code designators, each including in codal word order a major zone symbol for a first-coordinate parameter, a major zone symbol for a second-coordinate parameter, a minor zone symbol for the first-coordinate parameter, and a minor zone symbol for the second-coordinate parameter, said device comprising a first unit provided with three relatively fixed parallel scales one bearing a range of first-coordinate parametral indicia and the other two of which respectively bear the related major and minor zone symbols and are spaced apart transversely of their length, a second similar unit provided with three relatively fixed scales parallel to one another and to the previously mentioned scales, one of the scales on the second unit bearing a range of second-coordinate parametral indicia and the other two scales on the second unit respectively bearing the related major and minor zone symbols and being spaced apart transversely of their length, the scales of the two units being disposed in transversely staggered relationship, with the major zone symbol scale related to the second-coordinate parameters being arranged between the major and minor zone symbol scales related to the first-coordinate parameters and the minor zone symbol scale related to the first-coordinate parameters being arranged between the major and minor zone scales of the second-coordinate parameters, a common indexing member for all of said scales, and means associating said units and indexing member for relative movements in scale length direction to register the indexing member with any desired first- and second-coordinate parametral indicia and thereupon to register along said index member in series the corresponding major zone symbol for the first-coordinate parameter, the major zone symbol for the second-coordinate parameter, the minor zone symbol for the former parameter, and the minor zone symbol for the latter of the parameters, whereby the codal symbols of the designator for the desired, indexed coordinate parameters are indicated in the stated code word order.

3. An interpreting device to translate conventional geographic coordinate parameters into corresponding codal designators, each including in code word order a major zone codal representation of a first-coordinate parameter, a major zone codal representation of a second-coordinate parameter, a minor zone codal representation of the first-coordinate parameter, and a minor zone codal representation of the second-coordinate parameter; said device comprising a first slide unit provided with relatively fixed parallel spaced apart rules having three parallel scales one for a range of first-coordinate parametral indicia and the other two of which respectively bear the corresponding major and minor zone codal representations and are spaced apart transversely of their length, a second slide unit having relatively fixed spaced apart rules slidably interfitting with the rules of the first unit and provided with three parallel scales in transversely staggered relationship to the scales of the first unit and including a scale of second-coordinate parametral indicia, a scale of major zone codal representations for the second coordinate parameters interposed between the scales of major and minor zone codal representations for the first-coordinate parameters, and a scale of minor zone codal representations for the second-coordinate parameters transversely following the scale of minor zone codal representations for the first-coordinate parameters, and an index member slidably mounted to said units for relative adjustment along their scales, the first and second units being adjustable relatively to each other and to the index member to register the index member with any desired first- and second-coordinate parametral indicia and thereby to register concurrently along the index member in series the corresponding major zone codal representation for the first-coordinate parameter, the major zone codal representation for the second-coordinate parameter, the minor zone codal representation for the former parameter, and the minor zone codal representation for the latter of the parameters, whereby the codal representations of the codal designator corresponding to the indexed coordinate parameters are indicated in the stated word order.

References Cited in the file of this patent
UNITED STATES PATENTS

| | | |
|---|---|---|
| 621,348 | Keuffel | Mar. 21, 1899 |
| 847,767 | Harlan | Mar. 19, 1907 |
| 907,373 | Keuffel | Dec. 22, 1908 |
| 938,222 | Dinkelspiel | Oct. 26, 1909 |
| 2,170,144 | Kells et al. | Aug. 22, 1939 |